Dec. 11, 1945. D. FIRTH 2,390,876
MOUNTING FOR PULLEYS, ETC
Filed Feb. 21, 1944
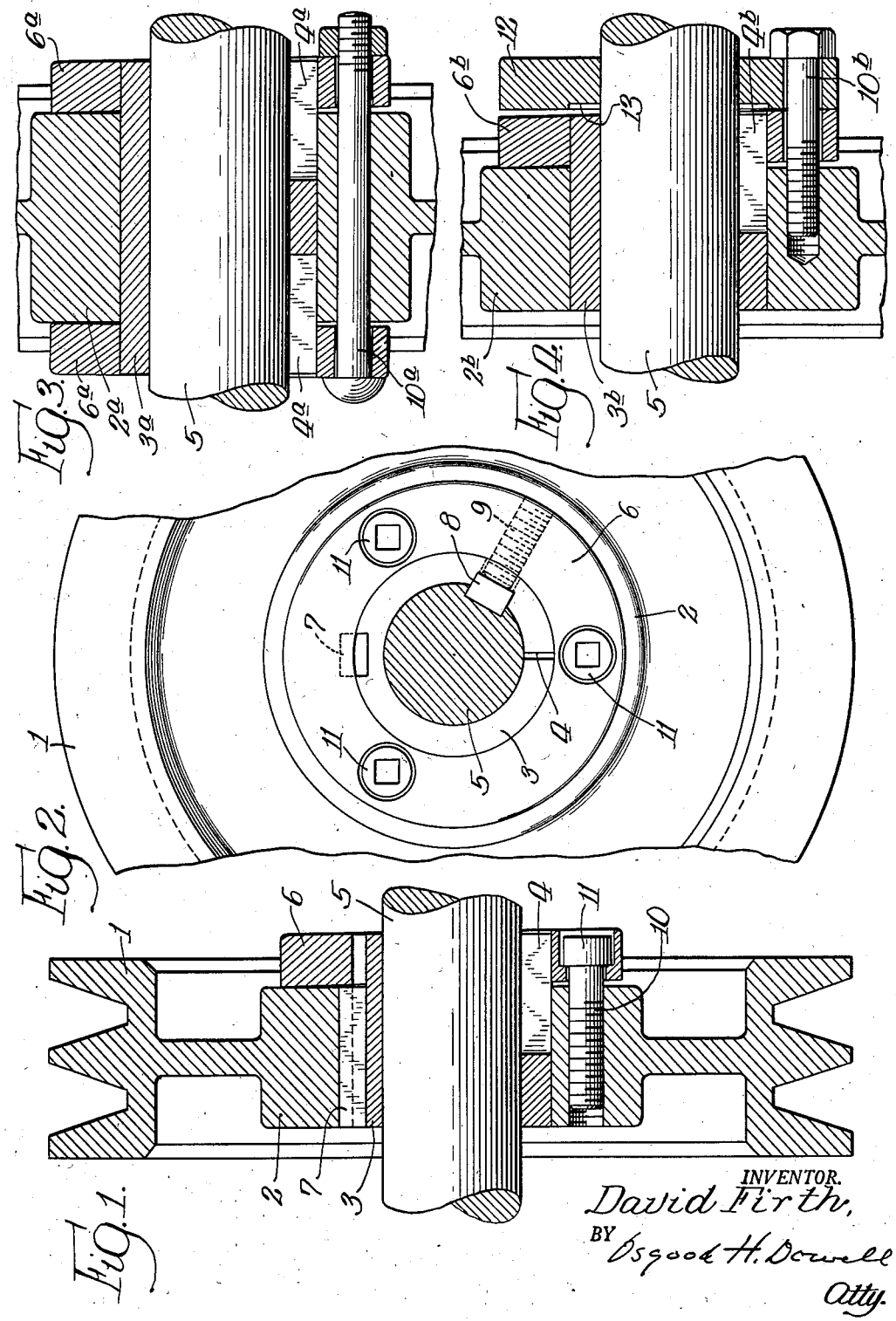
INVENTOR.
David Firth,
BY Osgood H. Dowell
Atty.

Patented Dec. 11, 1945

2,390,876

UNITED STATES PATENT OFFICE 2,390,876

MOUNTING FOR PULLEYS, ETC.

David Firth, South Bend, Ind., assignor to Dodge Manufacturing Corporation, Mishawaka, Ind., a corporation of Indiana Application February 21, 1944, Serial No. 523,229

7 Claims. (Cl. 287—52.07)

This invention pertains to the mounting on shafts of pulleys and other machine elements.

An object of the invention is to provide a novel mounting means of simple and practicable character whereby a unit comprising a pulley and such mounting means in assembly therewith can be readily installed by slipping it on a shaft and tightening threaded connections, and can be demounted by loosening such connections and slipping the unit off from the shaft. The unit includes an untapered hub bushing split for at least a part of its length and contractible to grip the shaft, which bushing when fitted in the pulley hub bore is to be slip-fittable on the shaft, either with a close or fairly close or a moderately free and easy slip fit, as may be appropriate to other conditions in any particular embodiment of the invention.

The invention will be described with reference to the accompanying drawing and will be more particularly pointed out and defined in the claims following the description.

In said drawing:

Fig. 1 is a longitudinal section of an illustrative embodiment of the invention, shown applied to a sheave for a V-belt drive.

Fig. 2 is an end view partially broken away, looking at the right hand end of Fig. 1.

Figs. 3 and 4 are longitudinal sections of other embodiments of the invention, the rim portions of the sheave or pulley being broken away.

There is shown for example in Figs. 1 and 2 a sheave 1 of conventional design, the hub 2 thereof being unsplit and having a straight or untapered bore. Fitted closely and preferably with a press fit in the hub is a bushing 3, preferably of hard or surface hardened steel, which is split for at least a part of its length as indicated at 4; said bushing being slip-fitted on the shaft 5 to which the sheave is applied. The bushing is of greater length than the hub and extends beyond an end thereof and through a thick collar 6 having a straight or untapered bore fitting the bushing. The collar 6 is preferably of hard steel or the like, or with a hardened center, and is preferably an undivided one-piece element, though it might be split or of composite construction if otherwise of appropriate proportions and stiffness and strength for the purpose of the invention as hereinafter indicated.

Although the bushing 3 may be split for its entire length, it is desirable to provide an unsplit incontractible part thereof in engagement with the pulley hub for a substantial part of its length; however the bushing must be longitudinally split and contractible for a sufficient part of its length, materially greater than and including the part of its length which extends through the collar, to enable the bushing to be contracted to grip the shaft, as presently to be explained.

The sheave hub may be keyed to the bushing by a key 7, and the bushing may be keyed to the shaft by a key 8. The hub key 7 may be driven tight in the keyway therefor on the hub, so as to be self-retained against longitudinal displacement. The shaft key 8 may be fixed to the shaft, or if slip-fitted in the groove therefor on its shaft it may be retained against longitudinal displacement by a radially disposed set screw 9 in the collar 6.

Said collar 6 is fastened to and adapted to be drawn forcibly against the hub by threaded bolt means represented in this instance by a plurality of screws 10 arranged parallel with the shaft and at suitably angularly spaced intervals; said screws being in threaded engagement with the hub and passing loosely through holes therefor in the collar and having enlarged heads 11 engaging the back of the collar or seats therefor in collar recesses in which the screws are countersunk. As shown in Fig. 2, the countersunk screwheads are provided with square sockets for engagement by a suitable wrench for tightening or loosening the connections between the hub and collar.

Fastening of the sheave hub to the shaft, so as to secure it against longitudinal displacement relative thereto, is effected by tightening the screws, due to a condition whereby the collar 6, in order to abut squarely against the hub, must be forced to a position relative thereto in which the collar bore is at an angle to the hub bore, with resultant gripping and contraction of the bushing 3. For effective results the bushing should have a sufficiently close fit in the hub and collar and on the shaft to be contracted into gripping engagement with the shaft by the canting of the collar as it is forced to a position squarely abutting the hub or through an angle substantially less than that through which it must be forced to abut the hub squarely.

A condition whereby the hub and collar can abut only in a manner other than squarely while their bores are aligned or at less than a certain angle to each other, is obtained in the illustrative structure by forming the collar 6 with its bore skewed or inclined to the longitudinal center of the collar, so that the bushing normally holds the collar in a canted instead of erect position thereon. Thus in the illustrative structure the parallel faces of the collar are aslant to the collar bore and inclined to the adjacent end face of the sheave hub, the latter being substantially perpendicular to the hub axis. An angle of inclination of about one degree is intended to be represented in the drawing, though the inclination may be more or less than that indicated, and in any specific embodiment of the invention the preferred angle of inclination will depend upon the particular design and relative proportion of parts including thickness of the collar 6 and closeness of fit between the interfitted parts.

When the screws 10 are under no tension, the sheave hub 2 and collar 6 are in a relationship in which their bores are substantially aligned, being held in such relationship by the bushing. Under this condition, as well as during tightening of the screws, the collar can bear against the hub only at a point to one side of the shaft. By tightening the screws or any of them, and especially the one of the three screws shown which is diametrically opposite and more remote from said bearing point than the others, the collar can be drawn forcibly against the hub to or toward a position for abutment of the collar squarely against the hub, or in other words toward a position of parallelism of their abutment faces. The collar is thereby forcibly canted to a position causing it to grip and contract the bushing into gripping engagement with the shaft, and thus fastening the sheave to the shaft. Upon loosening the screws sufficiently to release them from tension, the bushing will immediately restore the hub and collar to a relationship in which their bores are substantially aligned, whereupon the bushing in assembly with the sheave and collar can be slipped off from the shaft.

Thus the invention provides a simple and practicable mounting means whereby the unit comprising a pulley or other machine element and such mounting means therefor can be easily installed by slipping the assembled unit on a shaft and tightening threaded connections with the effect of fastening the pulley hub to the shaft, and can be easily and quickly demounted by sufficiently loosening such threaded connections and withdrawing the assembled unit from the shaft.

An advantage of the invention, among others, is that in production of such units the collars therefor as well as the sheave hubs may have bores of a common diameter, and only the bushings need to be differently bored to fit different sizes of shafts. To use such a unit on a shaft of different size from that for which the bushing is bored, it is only necessary to change the bore of the bushing or to substitute a like bushing of different bore. Hence it is unnecessary for the manufacturer of such units or merchandizers thereof to carry in stock any large quantity of extra parts; it being sufficient to carry, in addition to the manufacturer's or dealer's regular stock of complete units, a small quantity of extra bushings to accommodate purchasers desiring to change from one shaft size to another, and a few extra collars for possible occasional needs therefor for replacement parts.

Manifestly, the illustrative structure may be variously modified in details to suit various different requirements and conditions.

The bushing 3 may have a tight driving fit or a press fit in the sheave hub and a corresponding fit in the collar 6 in the sense that the bore of the collar is of the same diameter as the hub bore. The bushing may be originally of a diameter one or two thousandths of an inch greater than the diameter of the hub and collar bores and pressed in the hub, provided that in such case the resultant slight contraction of the bushing will leave it contractible and with its bore of appropriate diameter for at least a very close slip fit on the shaft on which the sheave is to be mounted. On the other hand, the bushing may have a close slip fit in the hub and collar, and a construction in which the bushing has easy slip fit in said elements is not excluded.

In case of a slip fit of the bushing in the sheave hub, then since the bushing may be held in fixed position on the shaft by tightening the set screw 9, it is also possible to demount the sheave by disengaging the screws therefrom and slipping it off from the bushing and shaft, and to replace it with a sheave of different diameter but of the same hub bore, by passing it over the shaft and slipping it on the bushing and re-engaging and tightening the screws, all without disturbing the relation of the collar and bushing and the position of the bushing on the shaft, thus insuring alignment of the replaced sheave with the other sheave of the drive. In this connection, the collar 6 is maintained in fixed axial relation to the bushing by the set screw 9 carried by the collar in threaded engagement therewith and passing through an unthreaded hole therefor in the bushing.

The condition whereby the hub abuts the collar only in a manner other than squarely while the hub and collar bores are aligned or at less than a certain angle to each other, may be obtained otherwise than by the specific means provided in the illustrative structure. For example, in a structure of similar character, utilizing instead of the collar 6 a similarly mounted and connected collar having its bore normal to or at right angles to its faces, said condition may be established by forming the adjacent end face of the sheave hub at a suitable inclination to the hub axis, or by interposing between the hub and collar a washer having its opposite faces in relatively inclined planes, or by forming the front face of the collar or the adjacent end face of the hub with a projection to provide for abutment of the collar against the hub primarily at a point to one side of the shaft and to allow them to be brought closer together or to or toward a relationship for abutting at both sides of the shaft by tightening the screws. Therefore such formal modifications, even though they may be less desirable or less fully advantageous than the preferred form of the invention shown, are to be regarded as within the scope of the invention. And in case of interposition of a washer between the hub and collar of the construction shown, or of any construction embodying the invention, the washer may be considered as providing an abutment face for the hub, or the collar may be considered as abutting or bearing against the hub indirectly through such washer.

Although in the illustrative structure the tightening of the screws 10 tends to cant both the sheave hub and collar in opposite directions, so that both tend to grip and contract the bushing, it may be considered that the desired effect is obtained principally or virtually by canting of the collar, assuming it to be of substantially less thickness than the length of the hub, as would ordinarily be the case. Canting of the sheave from erect position on the shaft to an extent to cause "run out" or wobbling in excess of the degree tolerated in manufacture would be objectionable, but in any construction in which the tightening of the screws would cant the sheave materially the effect can be counteracted by forming the sheave with its bore slightly skewed from the true center and arranging it so that the canting of the sheave by the tightening of the screws would tend to bring it to erect position or to a position in which the degree of "run out" is still within manufacturing tolerance.

Fig. 3 of the drawing represents an embodiment of the invention in which the bushing 3ª passes through collars 6ª in abutting relation to opposite ends of the sheave hub 2ª, said collars being identical to 6 and connected by a plurality of through bolts 10ª arranged similarly to the screws 10 and by tightening of which both collars 6ª are forcibly canted to grip and contract the bushing into gripping engagement with the shaft. In this instance the bushing 3ª as shown has an unsplit portion engaging the medial portion of the sheave hub and is split by slots 4ª extending from such unsplit portion to the opposite ends of the bushing.

Fig. 4 shows a construction differing from that of Figs. 1 and 2 only in that the collar 6ᵇ, corresponding to 6, is connected to the sheave hub 2ᵇ by bolts 10ᵇ and a second collar 12 loose on the shaft behind and abutting the collar 6ᵇ; said second collar being directly connected to the hub by said bolts, and the collar 6ᵇ being connected to the hub by said bolts indirectly through the abutting back collar 12. Said collar 12 is shown having in its front face a recess 13 to avoid abutting the end of the bushing 3ᵇ.

I claim:

1. A shaft-mountable unit comprising, in combination, a sheave or other machine element having a straight-bored hub, a hub bushing therein extending beyond an end of the hub, said bushing being split and contractible for at least a part of its length materially greater than and including the part of its length so extending, a straight-bored collar fitted on the extended portion of the bushing, the bore of the collar being skewed so that the bushing normally holds the collar in tilted position thereon, and threaded bolt means connecting the hub and collar whereby to force the collar to or toward erect position with resultant gripping and contraction of the bushing by the collar.

2. A shaft-mountable unit comprising, in combination, a sheave or other machine element having a straight-bored hub, a hub bushing therein extending beyond an end of the hub, said bushing being split and contractible for at least a part of its length materially greater than and including the part of its length so extending, a straight-bored collar fitted on the extended portion of the bushing, the confronting faces of the hub and collar being normally relatively inclined, and threaded bolt means connecting the hub and collar whereby to draw them one against the other to a relationship in which their bores are relatively inclined.

3. A shaft-mountable unit comprising, in combination, a sheave or other machine element having a straight-bored hub, a hub bushing therein extending beyond an end of the hub, said bushing being split and contractible for at least a part of its length materially greater than and including the part of its length so extending, a straight-bored collar fitted on the extended portion of the bushing, there being provision whereby the collar and hub can abut only in a manner other than squarely while their bores are aligned or at less than a certain angle to each other, and threaded bolt means connecting the hub and collar whereby to draw them to or toward squarely abutting relationship.

4. A shaft-mountable unit comprising, in combination, a sheave or other machine element having a straight-bored hub, a hub bushing therein extending beyond an end of the hub, said bushing having an unsplit portion engaging the hub for a substantial part of its length and a split contractible portion including and of materially greater length than the part so extending, a straight-bored collar fitted on the extended portion of the bushing, there being provision whereby the collar and hub can abut only in a manner other than squarely while their bores are aligned or at less than a certain angle to each other, and threaded bolt means connecting the hub and collar whereby to draw them to or toward squarely abutting relationship.

5. A shaft-mountable unit comprising, in combination, a sheave or other machine element having a straight-bored hub, a hub bushing therein extending beyond an end of the hub, said bushing being split and contractible for at least a part of its length including and materially greater than the part of its length so extending, a straight-bored collar fitted on the extended portion of the bushing, there being provision whereby the collar and hub can abut only in a manner other than squarely while their bores are aligned or at less than a certain angle to each other, threaded bolt means connecting the hub and collar whereby to draw them to or toward squarely abutting relationship, and means comprising a radially disposed set screw carried by and in threaded engagement with the collar and passing through an unthreaded hole in the bushing for maintaining the collar and bushing in fixed axial relation to each other and to a shaft, said bushing having said unthreaded hole.

6. A shaft-mountable unit comprising, in combination, a sheave or other machine element having a straight-bored hub, a hub bushing therein extending beyond an end of the hub, said bushing being split and contractible for at least a part of its length including and materially greater than the part of its length so extending, a collar fitted on the extended portion of the bushing, the collar being forcible to position to grip and contract the bushing, and screw means operable for forcing the collar to such position.

7. A shaft-mountable unit comprising, in combination, a sheave or other machine element having a straight-bored hub, a hub bushing therein extending beyond an end of the hub, said bushing being split and contractible for at least a part of its length including and materially greater than the part of its length so extending, a collar fitted on the extended portion of the bushing, and adjustable means connecting the hub and collar in abutting relation, there being provision whereby the collar is coactable with the bushing to grip and contract it by the tightening of said means.

DAVID FIRTH.